(12) United States Patent
Gokhale et al.

(10) Patent No.: US 7,877,362 B2
(45) Date of Patent: Jan. 25, 2011

(54) SYSTEM AND METHOD FOR CONTAINERIZED DATA STORAGE AND TRACKING

(75) Inventors: Parag Gokhale, Ocean, NJ (US); Rajiv Kottomtharayil, Marlboro, NJ (US)

(73) Assignee: CommVault Systems, Inc., Oceanport, NJ (US)

( * ) Notice: Subject to any disclaimer, the term of this patent is extended or adjusted under 35 U.S.C. 154(b) by 0 days.

(21) Appl. No.: 12/501,159

(22) Filed: Jul. 10, 2009

(65) Prior Publication Data
US 2009/0307448 A1 Dec. 10, 2009

Related U.S. Application Data

(63) Continuation of application No. 11/313,256, filed on Dec. 19, 2005, now Pat. No. 7,584,227.

(51) Int. Cl.
*G06F 7/00* (2006.01)
*G06F 17/00* (2006.01)

(52) U.S. Cl. .................. 707/661; 707/679; 707/812

(58) Field of Classification Search .......... 707/661, 707/667, 671, 679, 812, 999.204
See application file for complete search history.

(56) References Cited

U.S. PATENT DOCUMENTS

| 4,686,620 A | 8/1987 | Ng |
| 4,995,035 A | 2/1991 | Cole et al. |
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |

(Continued)

FOREIGN PATENT DOCUMENTS

EP 0259912 3/1988

(Continued)

OTHER PUBLICATIONS

Armstead et al., "Implementation of a Campus-wide Distributed Mass Storage Service: The Dream vs. Reality," *IEEE*, 1995, pp. 190-199.

(Continued)

*Primary Examiner*—John E Breene
*Assistant Examiner*—Phong Nguyen
(74) *Attorney, Agent, or Firm*—Perkins Coie LLP

(57) ABSTRACT

The invention provides a method and system for automatically aggregating data items and storage media and placing each in a container, based on a storage preferences. The items in the container are generally of a similar type or classification. The container may be tracked by the system instead of individually tracking and monitoring each of the data items and storage media contained in the container. The location of the container is tracked within the storage system and at offsite storage, for administrative, reporting or other uses.

26 Claims, 9 Drawing Sheets

U.S. PATENT DOCUMENTS

| | | |
|---|---|---|
| 5,321,816 A | 6/1994 | Rogan et al. |
| 5,333,315 A | 7/1994 | Saether et al. |
| 5,347,653 A | 9/1994 | Flynn et al. |
| 5,410,700 A | 4/1995 | Fecteau et al. |
| 5,448,724 A | 9/1995 | Hayashi |
| 5,491,810 A | 2/1996 | Allen |
| 5,495,607 A | 2/1996 | Pisello et al. |
| 5,504,873 A | 4/1996 | Martin et al. |
| 5,544,345 A | 8/1996 | Carpenter et al. |
| 5,544,347 A | 8/1996 | Yanai et al. |
| 5,559,957 A | 9/1996 | Balk |
| 5,619,644 A | 4/1997 | Crockett et al. |
| 5,638,509 A | 6/1997 | Dunphy et al. |
| 5,673,381 A | 9/1997 | Huai et al. |
| 5,699,361 A | 12/1997 | Ding et al. |
| 5,729,743 A | 3/1998 | Squibb |
| 5,751,997 A | 5/1998 | Kullick et al. |
| 5,758,359 A | 5/1998 | Saxon |
| 5,761,677 A | 6/1998 | Senator et al. |
| 5,764,972 A | 6/1998 | Crouse et al. |
| 5,778,395 A | 7/1998 | Whiting et al. |
| 5,812,398 A | 9/1998 | Nielsen |
| 5,813,009 A | 9/1998 | Johnson et al. |
| 5,813,017 A | 9/1998 | Morris |
| 5,875,478 A | 2/1999 | Blumenau |
| 5,887,134 A | 3/1999 | Ebrahim |
| 5,901,327 A | 5/1999 | Ofek |
| 5,924,102 A | 7/1999 | Perks |
| 5,950,205 A | 9/1999 | Aviani, Jr. |
| 5,974,563 A | 10/1999 | Beeler, Jr. |
| 6,021,415 A | 2/2000 | Cannon et al. |
| 6,026,414 A | 2/2000 | Anglin |
| 6,052,735 A | 4/2000 | Ulrich et al. |
| 6,076,148 A | 6/2000 | Kedem |
| 6,094,416 A | 7/2000 | Ying |
| 6,131,095 A | 10/2000 | Low et al. |
| 6,131,190 A | 10/2000 | Sidwell |
| 6,148,412 A | 11/2000 | Cannon et al. |
| 6,154,787 A | 11/2000 | Urevig et al. |
| 6,161,111 A | 12/2000 | Mutalik et al. |
| 6,167,402 A | 12/2000 | Yeager |
| 6,212,512 B1 | 4/2001 | Barney et al. |
| 6,246,882 B1 * | 6/2001 | Lachance ................ 455/456.4 |
| 6,260,069 B1 | 7/2001 | Anglin |
| 6,269,431 B1 | 7/2001 | Dunham |
| 6,275,953 B1 | 8/2001 | Vahalia et al. |
| 6,301,592 B1 | 10/2001 | Aoyama et al. |
| 6,324,581 B1 | 11/2001 | Xu et al. |
| 6,328,766 B1 | 12/2001 | Long |
| 6,330,570 B1 | 12/2001 | Crighton |
| 6,330,642 B1 | 12/2001 | Carteau |
| 6,343,324 B1 | 1/2002 | Hubis et al. |
| RE37,601 E | 3/2002 | Eastridge et al. |
| 6,356,801 B1 | 3/2002 | Goodman et al. |
| 6,389,432 B1 | 5/2002 | Pothapragada et al. |
| 6,421,711 B1 | 7/2002 | Blumenau et al. |
| 6,487,561 B1 | 11/2002 | Ofek et al. |
| 6,519,679 B2 | 2/2003 | Devireddy et al. |
| 6,538,669 B1 | 3/2003 | Lagueux, Jr. et al. |
| 6,564,228 B1 | 5/2003 | O'Connor |
| 6,658,436 B2 * | 12/2003 | Oshinsky et al. ....... 707/999.01 |
| 6,658,526 B2 | 12/2003 | Nguyen et al. |
| 6,909,356 B2 * | 6/2005 | Brown et al. ................. 340/5.2 |
| 7,010,387 B2 * | 3/2006 | Lantry et al. ................ 700/214 |
| 7,012,529 B2 * | 3/2006 | Sajkowsky ............... 340/572.1 |
| 7,034,683 B2 * | 4/2006 | Ghazarian ................ 340/568.1 |
| 7,107,298 B2 | 9/2006 | Prahlad et al. |
| 7,118,034 B2 | 10/2006 | Baldassari et al. |
| 7,130,970 B2 | 10/2006 | Devassy et al. |
| 7,136,720 B2 | 11/2006 | Deckers |
| 7,246,207 B2 * | 7/2007 | Kottomtharayil et al. .... 711/154 |
| 7,343,453 B2 | 3/2008 | Prahlad et al. |
| 7,596,586 B2 * | 9/2009 | Gokhale et al. ....... 707/999.204 |
| 2003/0055671 A1 * | 3/2003 | Nassar .......................... 705/1 |
| 2003/0101155 A1 * | 5/2003 | Gokhale et al. ................ 707/1 |
| 2004/0004119 A1 * | 1/2004 | Baldassari et al. .......... 235/384 |
| 2004/0049313 A1 * | 3/2004 | Deckers ..................... 700/214 |
| 2004/0167941 A1 * | 8/2004 | Prahlad et al. ............. 707/204 |
| 2004/0221114 A1 * | 11/2004 | Devassy et al. ............. 711/151 |
| 2005/0044114 A1 * | 2/2005 | Kottomtharayil et al. .... 707/204 |
| 2005/0099292 A1 * | 5/2005 | Sajkowsky ............. 340/539.13 |
| 2005/0174869 A1 | 8/2005 | Kottomtharayil et al. |
| 2007/0112459 A1 * | 5/2007 | Bell et al. ................... 700/221 |
| 2007/0162359 A1 | 7/2007 | Gokhale et al. |
| 2008/0250076 A1 * | 10/2008 | Muller et al. ............... 707/200 |

FOREIGN PATENT DOCUMENTS

| | | |
|---|---|---|
| EP | 0405926 | 1/1991 |
| EP | 0467546 | 1/1992 |
| EP | 0774715 | 5/1997 |
| EP | 0809184 | 11/1997 |
| EP | 0899662 | 3/1999 |
| EP | 0981090 | 2/2000 |
| WO | WO-95/13580 | 5/1995 |
| WO | WO-99/12098 | 3/1999 |

OTHER PUBLICATIONS

Arneson, "Mass Storage Archiving in Network Environments," Digest of Papers, Ninth IEEE Symposium on Mass Storage Systems, Oct. 31, 1988-Nov. 3, 1988, pp. 45-50, Monterey, CA.

Cabrera et al., "ADSM: A Multi-Platform, Scalable, Backup and Archive Mass Storage System," Digest of Papers, Compcon '95, Proceedings of the 40th IEEE Computer Society International Conference, Mar. 5, 1995-Mar.9, 1995, pp. 420-427, San Francisco, CA.

Eitel, "Backup and Storage Management in Distributed Heterogeneous Environments," *IEEE*, 1994, pp. 124-126.

Jander, M., "Launching Storage-Area Net," *Data Communications*, US, McGraw Hill, NY, vol. 27, No. 4 (Mar. 21, 1998), pp. 64-72.

Rosenblum et al., "The Design and Implementation of a Log-Structured File System," *Operating Systems Review SIGOPS*, vol. 25, No. 5, New York, US, pp. 1-15 (May 1991).

Jason Gait, "The Optical File Cabinet: A Random-Access File System for Write-Once Optical Disks," *IEEE Computer*, vol. 21, No. 6, pp. 11-22 (1988) (see in particular figure 5 in p. 15 and recitatiori in claim 5).

* cited by examiner

SYSTEM AND METHOD FOR CONTAINERIZED DATA STORAGE AND TRACKING

CROSS-REFERENCE TO RELATED APPLICATION(S)

This application is a continuation of U.S. patent application Ser. No. 11/313,256, titled SYSTEM AND METHOD FOR CONTAINERIZED DATA STORAGE AND TRACKING, filed Dec. 19, 2005 now U.S. Pat. No. 7,584,227, which is hereby incorporated herein by reference in its entirety. This application is related to the following pending applications, each of which is hereby incorporated herein by reference in its entirety:

Application Ser. No. 10/818,749, titled SYSTEM AND METHOD FOR DYNAMICALLY PERFORMING STORAGE OPERATIONS IN A COMPUTER NETWORK, filed Apr. 5, 2004;

Application Ser. No. 10/260,209, titled SYSTEM AND METHOD FOR ARCHIVING OBJECTS IN AN INFORMATION STORE, filed Sep. 30, 2002;

Application Ser. No. 11/120,619, titled HIERARCHICAL SYSTEMS AND METHODS FOR PROVIDING A UNIFIED VIEW OF STORAGE INFORMATION, filed May 2, 2005;

Application Ser. No. 10/990,363, titled SYSTEM AND METHOD FOR DATA STORAGE AND TRACKING, filed Nov. 15, 2004; and Application Ser. No. 60/752,203, titled System and Method for Classifying and Transferring Information in a Storage Network, filed Dec. 19, 2005.

COPYRIGHT NOTICE

A portion of the disclosure of this patent document contains material which is subject to copyright protection. The copyright owner has no objection to the facsimile reproduction by anyone of the patent document or the patent disclosures, as it appears in the Patent and Trademark Office patent files or records, but otherwise reserves all copyright rights whatsoever.

BACKGROUND

The invention disclosed herein relates generally to data storage systems in computer networks and, more particularly, to improvements in storing and tracking electronic data.

Storage architecture used by individual computers or data stores to store electronic data typically includes volatile storage media such as Random Access Memory RAM, and one or more nonvolatile storage devices such as hard drives, tape drives, optical disks, and other storage devices that form a part of or are directly associated with an individual computer. A network of computers such as a Local Area Network LAN or a Wide Area Network WAN, typically store electronic data via servers or stand-alone storage devices accessible via the network. Storage devices are generally connected to one individual computer or a network of computers. Examples of network storage devices include networkable tape drives, optical libraries, Redundant Arrays of Inexpensive Disks RAID, CD-ROM jukeboxes, and other devices. Network storage devices commonly known in the art often include slots in which tapes or other storage media may be stored, drives in which storage media may be placed for performing read or write operations or other storage operations, and a robotic arm which is used to place the tapes or storage media into the drives.

Storage media, such as tapes, media cartridges, CD-ROMs, disks or other media capable of storing data, may be used, for example, to store electronic data. Media may be fixed or removable. Fixed media is media that remains in hardware in which the media is read or written to. Removable media is media that may be removed from hardware, such as a storage device tape drive, in which the media is read or written to. Storage media that is removable is convenient for storing data because it may be removed from a storage device and moved from one location to another location for performing read and write operations, storage operations, or other use. The tapes or other storage media may be stored locally, for example to a system device or facility or to an offsite location. For example, third party vendors providing offsite data storage facilities, such as Iron Mountain, Inc. of Boston, Mass., store data for archiving or disaster recovery purposes. Typically, storage of the storage media to a local device or offsite location is provided by transferring the storage media between system devices or between system devices and the offsite location.

Various types and grades of storage media each have specific attributes, such as purchase price, cost to maintain and track, failure rate, capacity, and other characteristics. For example, one type of storage media may have a relatively low failure rate, but may have a relatively high purchase price and maintenance and tracking cost. Conversely, another type of storage media may be relatively inexpensive to purchase, maintain and track, but have a relatively high failure rate. Each type of storage media may be appropriate for a particular aspect of an enterprise storage plan, which may include different clients or data types. For example, one type of storage media may be used for a particular storage operation, another type of media may be used for short term storage and yet another type used for long term storage. In general, existing storage management systems may use more than one type of storage media in storage operations.

The status and location of (and other information relating to) each of the various types of media items may be monitored using a tracking system. Some existing storage systems have the capability to track individual items of storage media within a local or networked storage device, for example, the physical location of the media.

When storage media is transferred out of a storage device and exported to a remote or offsite storage location, existing storage management systems typically communicate with the offsite storage company to track the location of the offsite storage media or container of media. Offsite storage companies typically have a proprietary tracking system which may not interface automatically with an enterprise storage management system. This may result in inefficiencies caused by delays in locating and obtaining storage media stored at offsite storage facilities.

SUMMARY

The invention described herein includes a system and method for automatically aggregating storage media to facilitate performing storage operations and tracking storage media.

In one embodiment of the invention, a method for tracking a location of electronic data stored to removable media is provided in which a storage preference may be received which includes a data characteristic and a retention characteristic. The retention characteristic may be that a data item is due for a storage operation, such as an export operation or a migration operation. A plurality of data items may be identified that satisfy the data characteristic and the retention characteristic. A first set of one or more removable media including the plurality of data items are identified. The plurality of identified data items may be copied from the first set of one or more removable media to a copy set of one or more removable media. The copy set of one or more removable media may be aggregated in a container, the location of which is tracked. The container may be tracked by updating an index with data relating to the location of the container. The copy set of one or more removable media included in the container are generally not tracked individually.

In another embodiment of the invention, a method for tracking a location of data is provided, in which one or more removable media from a plurality of storage devices may be received. A storage preference may also be received, the storage preference including a data characteristic and a retention characteristic. One or more removable media may be determined to satisfy the storage preference; and aggregated in a container. A location of the container including the one or more removable media may be tracked, and not a location of the one or more removable media, individually.

In another embodiment of the invention, a method for tracking data is provided, in which an identifier for a first data item, of a plurality of data items, is stored in an index entry. A storage characteristic including a data classification and a retention characteristic may be received. A first data item may be determined to satisfy the storage characteristic; and aggregated in a container. The index entry may be updated for the first data item to indicate that the first data item is associated with the container, and the container may be tracked.

In another embodiment of the invention, a method for managing electronic data is providing in which a set of data satisfying a first storage characteristic is identified. From the identified set of data, a first subset of data satisfying a second storage characteristic is identified. Also identified is a second subset of data satisfying a third storage characteristic. Media including the first subset of data and the second subset of data are aggregated. The media including the first subset of data is exported to a first container. And the media including the second subset of data is exported to a second container.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION

The present invention relates to systems and methods for storing and tracking electronic data. Electronic data may be generated by one or more client computers as production data, which may be stored in a data store attached to the client. The production data in the data store may be stored in one or more copies, such as a primary copy, an auxiliary copy, or other copy. Each of these types of copies may be stored on media, such as optical media, disks, tapes, hard drives, or other removable media. Such media may be maintained and tracked in order to preserve electronic data, for example for data archival purposes, disaster recovery, or other data storage management requirements.

Although individual items of media may be tracked, certain types of data may have common characteristics, or other attributes which may make the data appropriate to be grouped. Such groups of data may be automatically aggregated into a container. The individual container and information relating to the common characteristics of the data contained in the container may be tracked. Tracking containers, instead of the individual media items located in the container, reduces the number of items tracked in a storage management system. Grouping data into containers based on a common characteristic is a useful method for storing data, for example, in long term storage. Often, when one data item is required for a storage operation, such as a data verification or restore operation, other related data having common characteristics or common attributes may also be required for the same storage operation.

Figure 1:
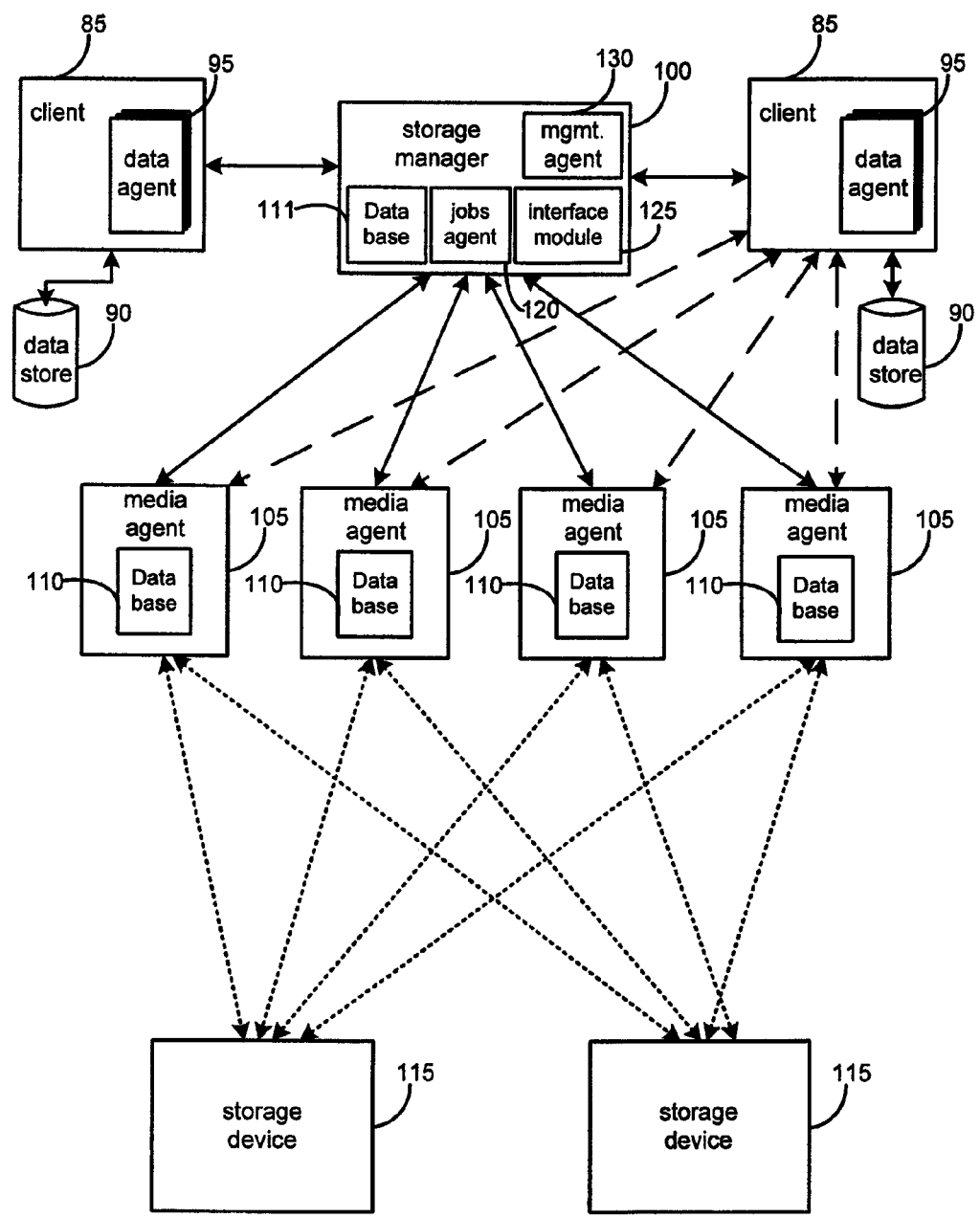
FIG. 1 is a block diagram of a storage operation cell in a system to perform storage operations on electronic data in a computer network according to an embodiment of the invention.

Embodiments and features of systems and methods for containerized storage management are described herein with reference to FIGS. 1 through 9. FIG. 1 illustrates a block diagram of a storage operation cell 50 that may perform storage operations on electronic data in a computer network in accordance with an embodiment of the invention. As shown, storage operation cell 50 may generally include a storage manager 100, a data agent 95, a media agent 105, a storage device 115, and, in some embodiments, may include certain other components such as a client 85, a data or information store 90, indexes or databases 110 and 111, a jobs agent 120, an interface module 125, and a management agent 130. Such system and elements thereof are exemplary of a modular storage management system such as the CommVault QiNetix system, and also the CommVault GALAXY storage management system, available from CommVault Systems, Inc. of Oceanport, N.J., and further described in U.S. patent application Ser. No. 09/610,738 which is incorporated herein by reference in its entirety.

A storage operation cell, such as cell 50, may generally include combinations of hardware and software components associated with performing storage operations on electronic data. Exemplary storage operation cells may include, CommCells as embodied in the QNet storage management system and the QiNetix storage management system by CommVault Systems of Oceanport, N.J. Storage operation cell 50 may be related to backup cells and provide some or all of the functionality of backup cells as described in application Ser. No. 09/354,058. In addition, storage operation cells may also perform additional types of storage operations and other types of storage management functions that are not generally offered by backup cells.

Storage operations performed by a storage operation cell may include creating, storing, retrieving, and migrating primary or production data copies and secondary data copies (which may include, for example, snapshot copies, backup copies, HSM copies, archive copies, and other types of copies of electronic data). Storage operation cells may also provide one or more integrated management consoles for users or system processes to interface with in order to perform certain storage operations on electronic data as further described herein. Such integrated management consoles may be displayed at a central control facility or several similar consoles distributed throughout multiple network locations to provide global or geographically specific network data storage information.

Storage operations may be performed according to a storage policy. A storage policy is generally a data structure or other information source that includes a set of preferences and other storage criteria for performing a storage operation. The preferences and storage criteria may include, but are not limited to, a storage location, relationships between system components, network pathway to utilize, retention policies, data characteristics, compression or encryption requirements, preferred system components to utilize in a storage operation, and other criteria relating to a storage operation. Thus, a storage policy may indicate that certain data is to be stored in a specific storage device, retained for a specified period of time before being aged to another tier of secondary storage, copied to secondary storage using a specified number of streams, etc. A storage policy may be stored to a storage manager index or database 111, to archive media as metadata for use in restore operations or other storage operations, or to other locations or components of the system.

A retention policy may include characteristics for retaining data in storage. The retention policy may include preferences for media used to store data, length of time to store data, aging criteria or other retention criteria. The retention criteria may be applied to data based on the data type, a storage operation cell related to the data, user that generated the data, the client application type, or other basis.

A storage preference is a storage policy, user preference or other storage preference. The storage preference may be defined by a system user or system administrator, or alternatively, the storage preference is a default preference. Examples of storage preferences can include: data classification, such as classes of data to be associated with a particular storage policy, container settings, such as settings for automatically aggregating media into a container, data security settings, encryption settings, data retention requirements, frequency of storage operations, types of data for storage operations, types of storage operations to perform in the component group or cell, network pathways, such as preferred network pathways to perform a storage operation, scheduling, such as a schedule of storage operations, reports, such as automatic generation of system reports regarding the group, which can include, for example the storage operations performed by the group, or other storage preference.

A schedule policy may specify when and how often to perform storage operations and may also specify performing certain storage operations on sub-clients of data and how to treat those sub-clients. A sub-client may represent static or dynamic associations of portions of data of a volume and are mutually exclusive. Thus, a portion of data may be given a label and the association is stored as a static entity in an index, database or other storage location used by system components. Sub-clients may also be used as an effective administrative scheme of organizing data according to data type, department within the enterprise, storage preferences, etc. For example, an administrator may find it preferable to separate e-mail data from financial data using two different sub-clients having different storage preferences, retention criteria, etc.

A storage manager 100 may control one or more cells 50 (whether or not each storage cell 50 has its own dedicated storage manager 100). Moreover, in certain embodiments, the extent or type of overlap may be user-defined (through a control console (not shown)) or may be automatically configured to optimize data storage and/or retrieval.

Data agent 95 may be a software module or part of a software module that is generally responsible for archiving, migrating, and recovering data from client computer 85 stored in an information store 90 or other memory location. Each client computer 85 may have at least one data agent 95 and the system can support multiple client computers 85. In some embodiments, data agents 95 may be distributed between client 85 and storage manager 100 (and any other intermediate components (not shown)) or may be deployed from a remote location or its functions approximated by a remote process that performs some or all of the functions of data agent 95.

Multiple data agents 95 may be employed for one or more clients 85. Each data agent 95 may perform a storage operation with data associated with a different client application. For example, different individual data agents 95 may be designed to handle MICROSOFT EXCHANGE Data, LOTUS NOTES Data, MICROSOFT WINDOWS 2000 File System Data, MICROSOFT ACTIVE DIRECTORY OBJECTS Data, and other types of data known in the art. Other embodiments may employ one or more generic data agents 95 that can handle and process multiple data types rather than using the specialized data agents described above.

If a client computer 85 has two or more types of data, one data agent 95 may be required for each data type to archive, migrate, and restore the client computer 85 data. For example, to perform storage operations on all of the data on a MICROSOFT EXCHANGE 2000 server, the client computer 85 may use one MICROSOFT EXCHANGE 2000 Mailbox data agent 95 to perform a storage operation on the EXCHANGE 2000 mailboxes, one MICROSOFT EXCHANGE 2000 Database data agent 95 to perform a storage operation on the EXCHANGE 2000 databases, one MICROSOFT EXCHANGE 2000 Public Folder data agent 95 to perform a storage operation on the EXCHANGE 2000 Public Folders, and one MICROSOFT WINDOWS 2000 File System data agent 95 to perform a storage operation on the client computer's 85 WINDOWS file system. These data agents 95 would be treated as four separate data agents 95 by the system even though they may reside on the same client computer 85.

Alternatively, other embodiments may use one or more generic data agents 95, each of which may be capable of handling two or more data types. For example, one generic data agent 95 may be used to perform a storage operation on MICROSOFT EXCHANGE 2000 Mailbox data and MICROSOFT EXCHANGE 2000 Database data while another generic data agent may handle MICROSOFT EXCHANGE 2000 Public Folder data and MICROSOFT WINDOWS 2000 File System data, etc.

Generally speaking, storage manager 100 may be a software module or other application that coordinates and controls storage operations performed by storage operation cell 50. Storage manager 100 may communicate with some or all elements of storage operation cell 50 including client computers 85, data agents 95, media agents 105, and storage devices 115, to initiate and manage system storage operations.

Storage manager 100 may include a jobs agent 120 that monitors the status of some or all storage operations previously performed, currently being performed, or scheduled to be performed by storage operation cell 50. Jobs agent 120 may be communicatively coupled with an interface module 125 (typically a software module or application). Interface module 125 may include information processing and display software, such as a graphical user interface ("GUI"), an application program interface ("API"), or other interactive interface through which users and system processes can retrieve information about the status of storage operations. Through interface 125, users may optionally issue instructions to various storage operation cells 50 regarding performance of the storage operations as described and contemplated by the present invention. For example, a user may modify a schedule concerning the number of pending snapshot copies or other types of copies scheduled as needed to suit particular needs or requirements. As another example, a user may employ the GUI to view the status of pending storage operations in some or all of the storage operation cells in a given network or to monitor the status of certain components in a particular storage operation cell (e.g., the amount of storage capacity left in a particular storage device). As a further example, interface 125 may display the cost metrics associated with a particular type of data storage and may allow a user to determine overall and target cost metrics associated with a particular data type, tracking media individually or a group of media in a container, or certain storage operation cell 50 or other storage operation as predefined or user-defined.

Storage manager 100 may also include a management agent 130 that is typically implemented as a software module or application program. In general, management agent 130 provides an interface that allows various management components 100 in other storage operation cells 50 to communicate with one another. For example, assume a certain network configuration includes multiple cells 50 adjacent to one another or otherwise logically related in a WAN or LAN configuration such as the multiple cells shown in FIG. 2. With this arrangement, storage operation cells 1-n (140, 145, 150, 155, 160 and 165) may be connected to another cell through an interface module. Referring again to FIG. 1, this allows each cell 50 to send and receive certain pertinent information from other cells 50 including status information, routing information, information regarding capacity and utilization, etc. These communication paths may also be used to convey information and instructions regarding storage operations.

For example, a management agent 130 in first storage operation cell 50 may communicate with a management agent 130 in a second storage operation cell 50 regarding the status of storage operations in the second storage operation cell. Another illustrative example includes the case where a management agent 130 in first storage operation cell 50 communicates with a management agent 130 in a second storage operation cell to control the storage manager 100 (and other components) of the second storage operation cell via the management agent 130 contained in the storage manager 100.

Figure 2:
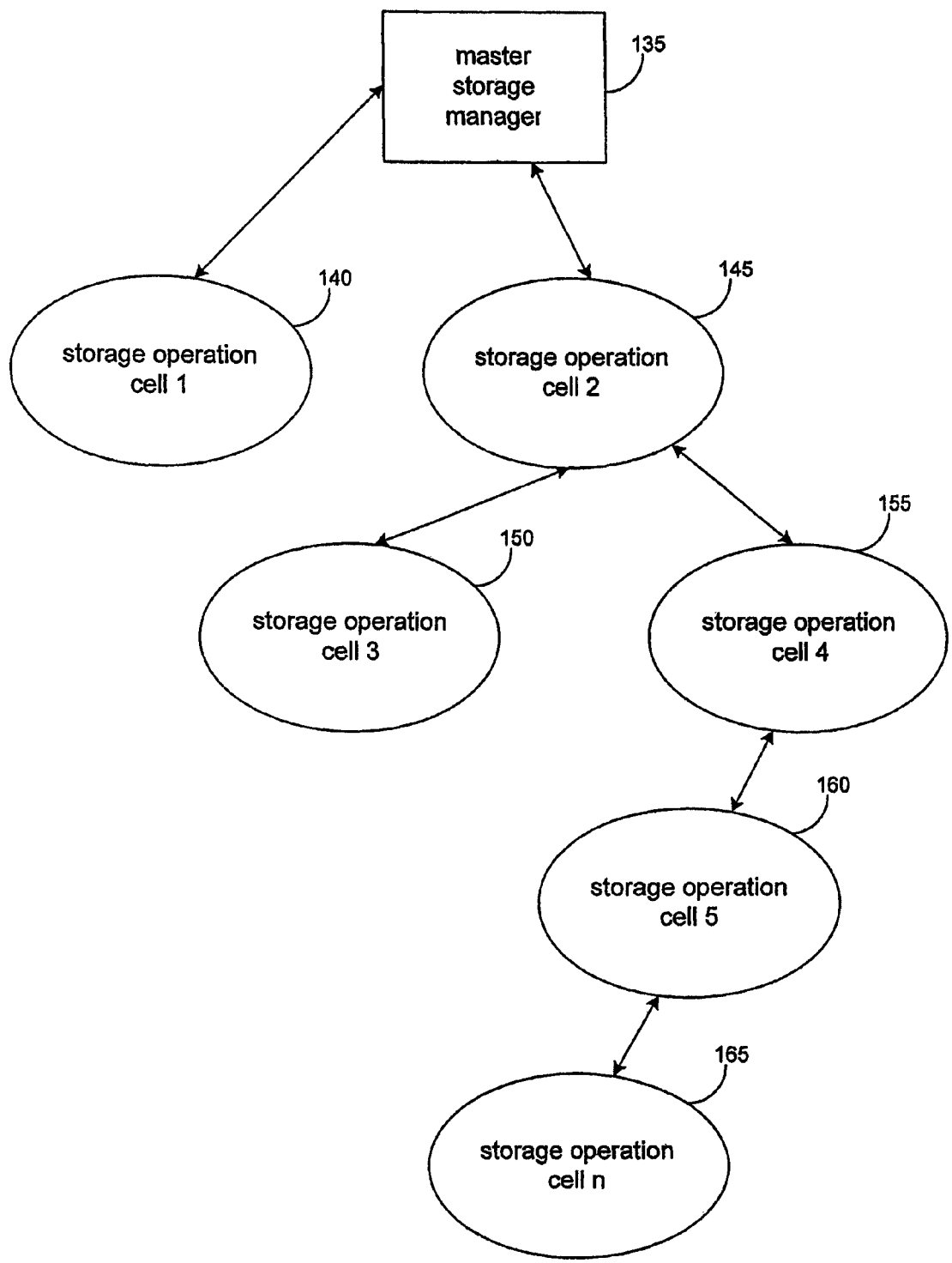
FIG. 2 is a block diagram of a hierarchically organized group of storage operation cells in a system to perform storage operations on electronic data in a computer network according to an embodiment of the invention.
Figure 3:
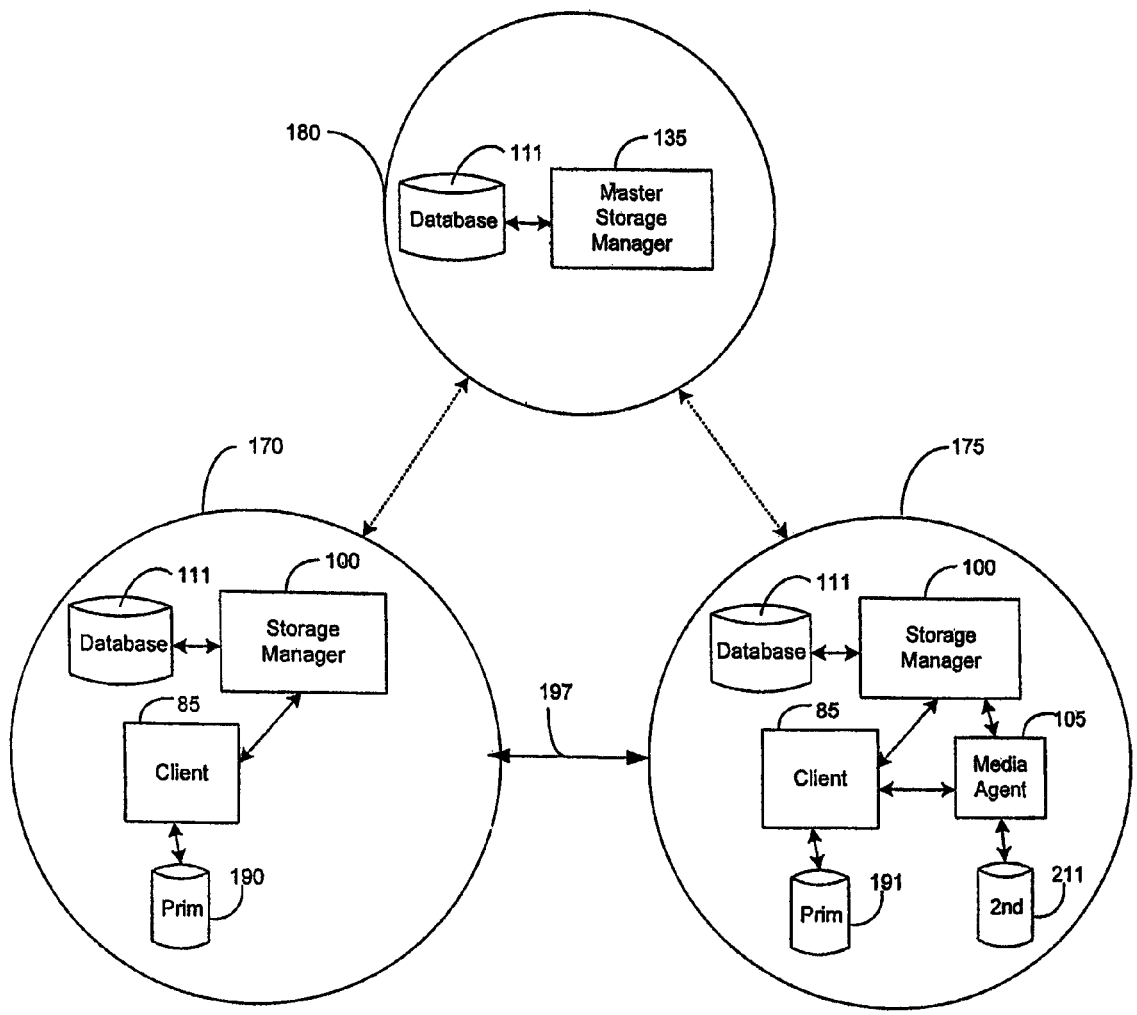
FIG. 3 is a block diagram of a hierarchically organized group of storage operation cells in a system to perform storage operations on electronic data in a computer network according to an embodiment of the invention.

Another illustrative example is the case where management agent 130 in the first storage operation cell 50 communicates directly with and controls the components in the second storage management cell 50 and bypasses the storage manager 100 in the second storage management cell. If desired, storage operation cells 50 can also be organized hierarchically such that hierarchically superior cells control or pass information to hierarchically subordinate cells or vice versa. Such an example is depicted in FIG. 3 in which a master storage manager 135 associated with a storage operation cell 180. Cell 180 is connected to cells 170 and 175, each of which cells has a storage manager 100, database 111, client 85 and primary copy storage 190, 191. Cells 170 and 175 may communicate, e.g., via communications link 197 and coordinate performance of storage operations and bypass the master storage manager 135. Cell 175 further includes a media agent 105 and secondary storage 211. As shown in FIGS. 1-3, the cell storage operation architecture may include different controlling components which provides flexibility in performing storage operations.

Storage manager 100 may also maintain an index cache, a database, or other data structure 111. The data stored in database 111 may be used to indicate logical associations between components of the system, user preferences, management tasks, some SRM or HSM data or other useful data. As further described herein, some of this information may be stored in a media agent database 110 or other local data store according to some embodiments. For example, the storage manager 100 may use data from database 111 to track logical associations between media agents 105 and storage devices 115.

Generally speaking, a media agent 105 may be implemented as a software module that conveys data, as directed by a storage manager 100, between a client computer 85 and one or more storage devices 115 such as a tape library, a magnetic media storage device, an optical media storage device, or any other suitable storage device. In one embodiment, media agents 105 may be communicatively coupled with and control a storage device 115 associated with that particular media agent 105. A media agent 105 may be considered to be associated with a particular storage device 115 if that media agent 105 is capable of routing and storing data to particular storage device 115.

Figure 4:
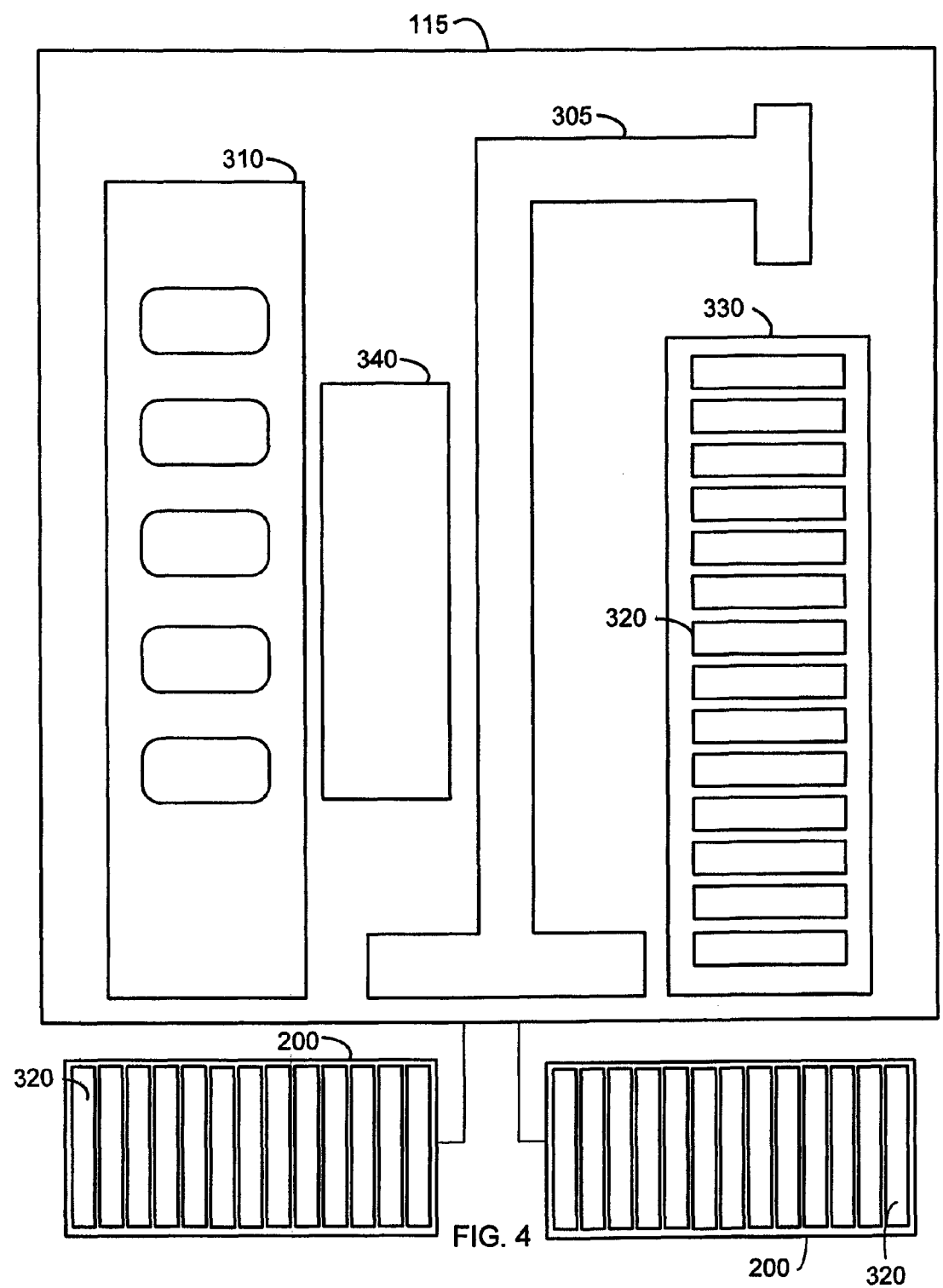
FIG. 4 is a block diagram showing a storage device according to an embodiment of the invention.
Figure 5:
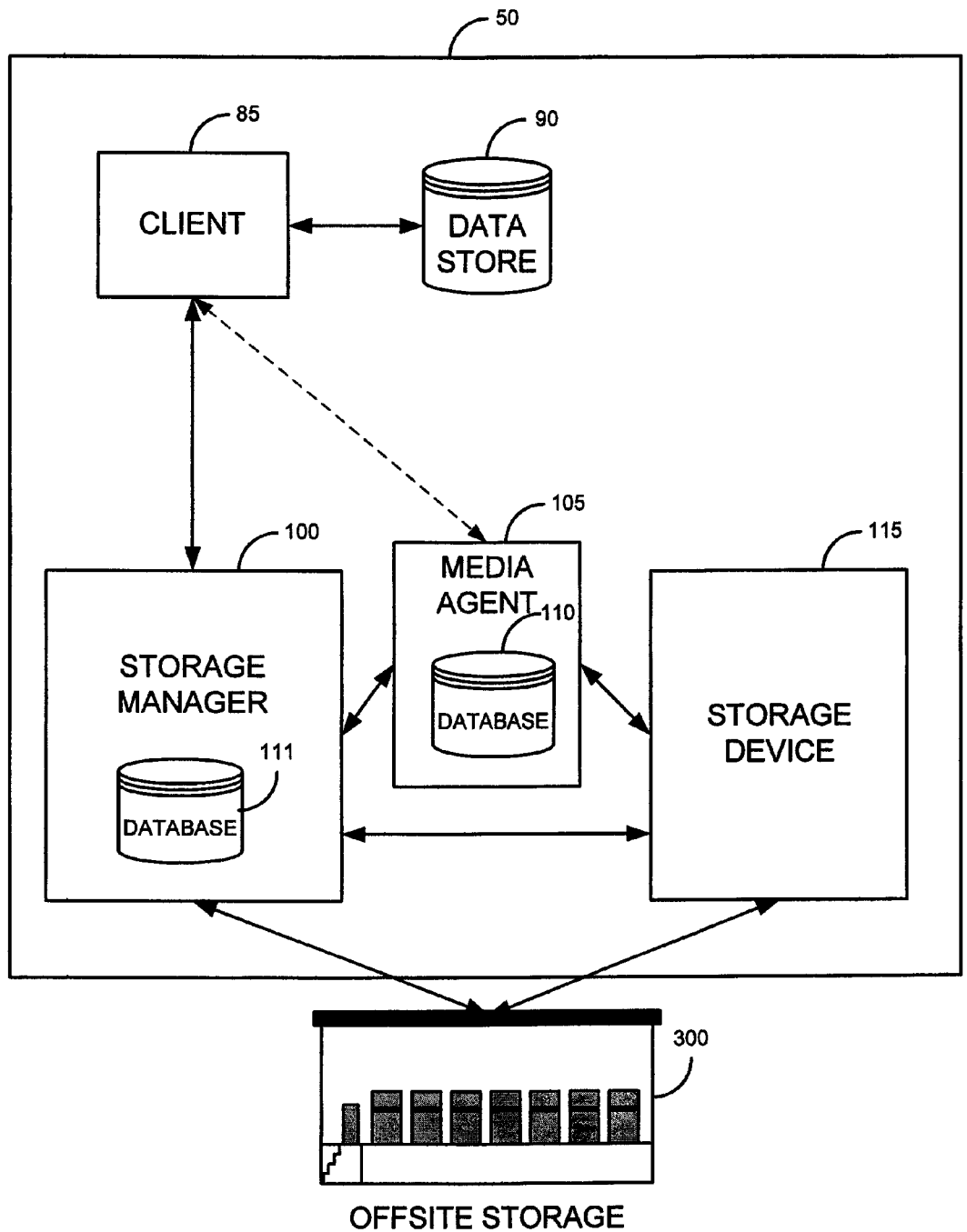
FIG. 5 is a block diagram showing a high-level view of the storage network architecture and components according to an embodiment of the invention.

In operation, a media agent 105 associated with a particular storage device 115 may instruct the storage device 115, such as the storage device 115 depicted in FIG. 4, to use a robotic arm 305 or other retrieval means to load or eject a certain storage media 320, and to subsequently archive, migrate, or restore data to or from that media. The storage device 115 may also include slots 330 in which storage media 320 may be placed, drives 310 for reading or writing data on storage media 320, a door 340 through which media 320 may be received to or removed from the storage device 115. The storage device 115 may also be coupled to one or more containers 200, as further described herein, in which media 320 may be stored. For example, one or more containers 200 may be set up adjacent to the door 340 and receive media 320 exported from a storage device 115. Alternatively, media 320 may exit a storage device door 340 and travel on a conveyer belt to a container 200. The media 320 is generally tapes, disks, media cartridges, CD-ROMs or other removable media capable of storing data. Container 200 may be any receptacle, such as a box, bucket or other container capable of receiving one or more media 320. Container 200 is typically coupled to the storage device 115 and located outside of the storage device 115. For example, the container 200 may be accessible through a door 340 in the storage device 115. The container 200 may have qualities that make it especially suitable for storing media, for example, it may be waterproof, lockable, durable, airtight impervious to external temperature changes, or other qualities. Container 200 may also have an associated size attribute that sets a maximum media capacity, such as fifty tapes. If the total media to be exported to the container 200 exceeds the container media capacity, a storage manager 100 or media agent 105 will automatically provide another container 200 for the excess media. Containers 200 may be automatically provided in accordance with user preferences, storage policies or other storage preferences. The containers 200, may be created for groups of media 320 which have common characteristics, and the media 320 may be automatically allocated to containers 200 according to the characteristics, such as retention characteristics, aging characteristics, or are needed for storage operations, or destined for a similar location, such as a library, an enterprise for a restore operation, a spare media pool, or other location.

Referring again to FIG. 1, media agents 105 may communicate with a storage device 115 via a suitable communications path such as a SCSI or fiber channel communications link. In some embodiments, the storage device 115 may be communicatively coupled to a data agent 105 via a Storage Area Network ("SAN"). Each media agent 105 may maintain a index cache, a database, or other data structure 110 which stores index data generated during a storage operation, such as a migration, or restore or other storage operations as described herein. For example, performing storage operations on MICROSOFT EXCHANGE data may generate index data. Such index data provides a media agent 105 or other external device with a fast and efficient mechanism for locating data stored or copied. Thus, a storage manger database 111 may store data associating a client 85 with a particular media agent 105 or storage device 115, for example, as specified in a storage policy, user preference or other preference, while media agent database 110 may indicate where specifically the client 85 data is stored in storage device 115, what specific files were stored, and other information associated with storage of client 85 data. In some embodiments, such index data may be stored along with the data copied in a storage device 115, with an additional copy of the index data written to index cache 110. The data in index cache 110 is thus readily available for use in storage operations and other activities without having to be first retrieved from the storage device 115.

Certain components may reside and execute on the same computer. For example, a client computer 85 such as a data agent 95, a media agent 105, or a storage manager 100 coordinates and directs local archiving, migration, and retrieval application functions as further described in U.S. patent application Ser. No. 09/610,738. This client computer 85 can function independently or together with other similar client computers 85.

Storage operation cells may contain not only physical devices, but also may represent logical concepts, organizations, and hierarchies. For example, a first storage operation cell 50 may be configured to perform HSM operations, such as data copy operations or other types of data migration, and may include a variety of physical components including a storage manager 100 (or management agent 130), a media agent 105, a client component 85, and other components as described herein. A second storage operation cell may contain the same or similar physical components, however, it may be configured to perform SRM operations, such as monitoring a primary data copy or performing other known SRM operations.

A storage operation cell may also be manually configured by a user or automatically configured in accordance with user preferences, a storage policy or storage preferences. For example, a storage operation cell may also be organized hierarchically according to function, geography, architectural considerations, or other factors useful or desirable in performing storage operations. For example, a storage operation cell may be directed to create snapshot copies of primary copy data, another storage operation cell may be directed to create copies of primary copy data or other data. In addition, one storage operation cell may represent a geographic segment of an enterprise, such as a Chicago office, and a second storage operation cell may represents a different geographic segment, such as a New York office. Further storage operation cells may represent departments within the New York office, and yet further storage operation cells may represent a particular application data type used by a department, or a department user's data. Alternatively, these storage operation cells could be further divided by function performing various types of copies for the New York office or load balancing storage operations for the New York office.

The configuration of the storage operation cells may be manually established by a user. For example, a user may configure a particular client 85 to be associated in a storage operation cell with a particular storage device 115 and media agent 105. Alternatively, a storage policy may automatically cause a storage operation cell to be configured to include another client 85, a storage manager 100, another media agent 105 and another storage device 115. For example, a storage policy may set forth a storage operation cell configured to handle all of a user's MICROSOFT EXCHANGE data, or all data arising from a particular group of users, or other category of data.

The hierarchical organization of storage operation cells may facilitate storage management planning and provisioning by providing a basis for automatically grouping data to be included in a container. For example, a storage operation cell for MICROSOFT EXCHANGE data or all of a user's data may be automatically aggregated to be included in a container. Depending on a retention characteristic, storage policy, or other storage preference, the container may be exported offsite. For example, with reference to FIGS. 4 and 5, data relating to a storage operation call may be exported from a storage device 115 by directing a robotic arm 305 to remove a media item 320 from a slot 330 and place the media 320 in the door 340 for export to a container 200. The container may be moved to an offsite location 300, such as a warehouse, storage facility or other facility for storing media or other data, such as the storage facilities provided by Iron Mountain, Inc. of Boston, Mass.

Media 320 may be stored, e.g., to a storage device 115, container 200, offsite storage 300, or other location as directed by the storage manager 100 (or media agent 105), for example, in accordance with a storage policy or user input. For example, a storage preference or storage policy may specify that one or more media items 320, such as a group of media relating to a storage operation cell, should be aggregated into a container 200 and exported offsite for a particular time period, according to retention requirements.

Figure 6:
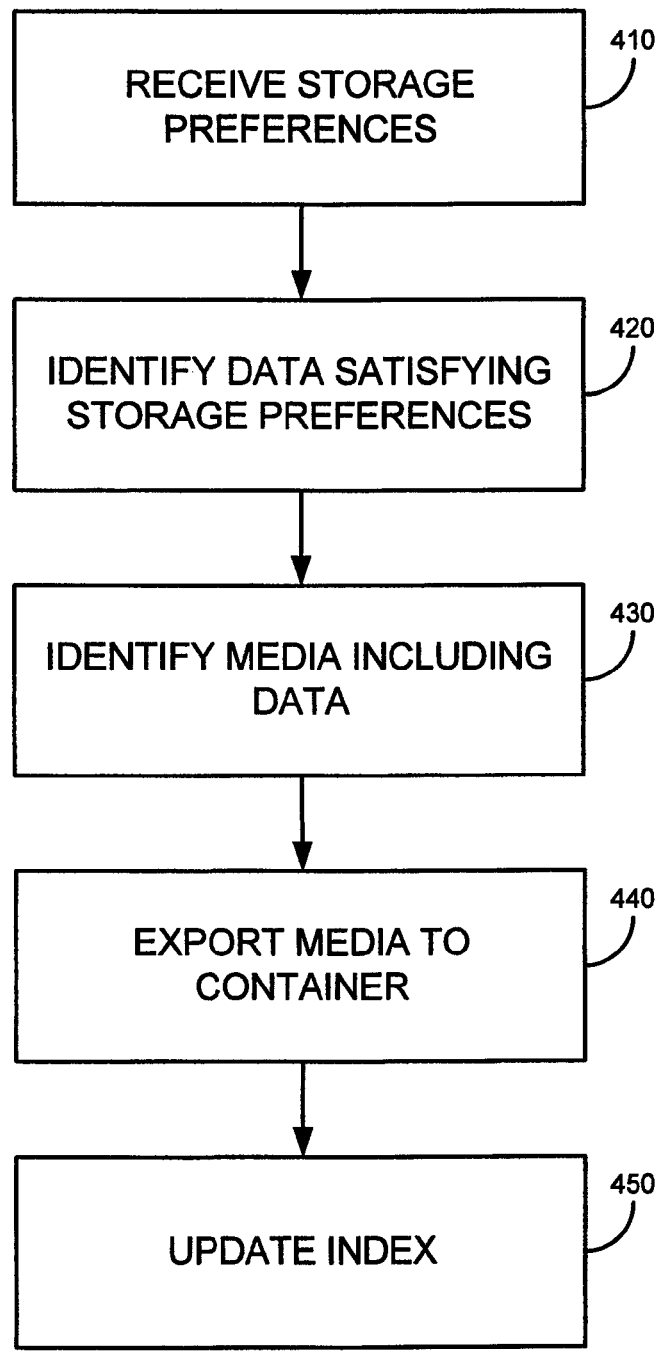
FIG. 6 is a flow diagram for a method of aggregating data according to an embodiment of the invention.

Referring to FIG. 6, which depicts a high-level flow diagram of an embodiment of the invention for aggregating media, a storage manager, media agent or other storage controller component receives storage preference data, step 410. For example, a user or administrator may set storage preferences, retention characteristics, or storage policies as described herein, such as a data classification or storage operation cell or other basis, for aggregating data. Alternatively, based on a storage policy or storage preferences which may be automatically set forth in, for example, a template or default setting, storage operation cell, or other storage operation preference information may be communicated to a storage manager or media agent. Some examples of categories or classes of data that may be aggregated include, for example, data generated by a particular user, department, company location, storage operation cell, client application, client device, or data generated at a particular time, data destined for the same location, data to be restored, data for a particular storage operation, or other classification. For example, a data classification could be all email generated by a particular employee, all documents and spreadsheets created by a particular employee, all financial trades executed on a certain date, or other classification. The storage preference may also include a retention characteristic which specifies retention criteria for data. The retention characteristic may indicate that data, such as the data generated or associated with a storage operation cell, has reached an age or otherwise surpassed a retention threshold where it is appropriate to export the data offsite.

In accordance with the storage preference data, the storage manager, media agent or other storage controller identifies data that satisfies the storage preferences, step 420. In general, the storage manager or media agent may query or consult an index to identify data that satisfies the storage preferences. Satisfying the storage preference may include, for example, an exact match of the characteristic, meeting a threshold of the storage preference, or lying within a range of values corresponding to the storage preference. For example, the storage manager may receive a storage preference or storage policy that indicates that all of a user's email data may be stored in a container, all data related to a storage operation cell be aggregated in a container, all MICROSOFT EXCHANGE data be grouped, or other classification, and consult its index to identify such data.

Alternatively, a storage manager (or media agent) may read metadata tags associated with data to identify data that satisfies the storage preference(s). For example, when a secondary copy of data is created, a header tag may be inserted before the copied data that includes metadata, such as data content, application data type, user information or other metadata.

Groups of data may be further subdivided into more than one group. For example, a first subset group of data may be identified having a first characteristic, such as a retention or other characteristic. Then a second subset of the identified group of data may be identified which has a second characteristic, such as a data application type, associated user, client, department, etc.

Media which includes the identified data may be identified by consulting a storage manager (or media agent) index, step 430. And accordingly, for further divisions of groups, the media including the first or second subsets of data may also be identified by consulting the index. The index may also supply information indicating the location of the data, such as any removable media items the data may be stored to. In the event that the data identified in step 420 has not yet been copied to media, the storage manager may initiate a storage operation to store the data to removable media. Media identified as including the identified data may be used to optionally create a copy set of the identified data items onto removable media. For example, a first set of media, such as tapes, may be identified as including files relating to the identified data and other data. The first set of tapes may be used as a data source for creating a copy, such as an auxiliary copy, of the identified data files to a copy set of removable media which may include the identified data files.

The media identified in step 430 (or the copy set of removable media) including the identified data that satisfies the storage preferences or storage policy are exported to a container, step 440. In the event that there are a first and second subset of data, media including each of the first and second subset of data are exported to two containers, one or each subset of data. In general, the storage manager initiates an export operation by directing the media agent to perform an export operation in a storage device. For example, the media agent may direct a robotic arm in a storage device to remove a particular media item from a storage device slot, drive or other location and export it from the storage device through a door. The media may be removed from the storage device and placed into a container.

The container may have an identifier, which may be affixed to the container in a barcode label, radio frequency identification tag (RFID) or other label. Such identifier may be automatically generated by a media agent and may use a naming convention based on the storage preference or storage policy, copy name, user name, storage operation cell, data type, application, client name, date or number of container that may have been used to aggregate the data included in the container. Information relating to the container and media and data included in the container may be tracked by updating an index with index data relating to the container, step 450. In general, the index is updated to revise index entries relating to the data and media so that the index entries point to or otherwise track the new container identifier. Thus, one or more media items that satisfy a storage preference or storage policy may be aggregated and placed in a container and the container may be subsequently tracked instead of continuing to track each individual item of data.

A storage manager may also receive container tracking data from an offsite location, which may be updated in the index. Alternatively, the storage manager may interface directly with an offsite tracking system to provide index data relating to the container. Although the system described herein is capable of tracking individual data items and the corresponding media item on which each data item is stored, aggregating related data and media into a container and limiting tracking to the container provides the advantage of being able to maintain highly detailed tracking information about data and media items, while reducing the number of actual objects that are tracked.

The container may be tracked by a storage manager (or media agent) in accordance with a tracking policy. A tracking policy may include information related to the container, or media item, such as: location, due back, container status, container retention, final destination, scheduling, storage operations, or other container information. Location information in a tracking policy includes information related to the present location of container, such as a geographic location, storage facility or other location. Due back information in a tracking policy refers to a container that is due to return to the system, for example, for a storage operation, such as data restore, or data reverification, or due back for an audit or other purpose. Due back information may be based on a storage policy which may set a frequency for performing storage operations on particular data.

Container status information may be used in tracking policies to refer to the status of the container, such as whether the container is stored locally, or exported to offsite storage or in transit to offsite storage. Container status information may be provided by a tracking system, such as an offsite storage tracking system, a transportation provider's tracking system, by RFID tags which may be affixed to a container, or other tracking system. Container status information may also provide an indication of the age of the media contained in the container, which may be used to initiate a data verification operation. Container status information may also indicate the volume or capacity of the container, such as the container includes five media item and has space for ten additional media items.

Container retention information in a tracking policy may provide information related to the retention characteristics for container. Such retention characteristics may be based on a storage policy for the container or data items included in the container. For example, container retention may be a particular time to maintain the container in a particular storage environment before aging off the data.

Final destination information in a tracking policy may relate to the destination for the container item. The destination information may be based on a storage policy and may also be related to container retention. For example, a final destination for a container that is being sent offsite may be a warehouse or other offsite location. If a container is in transit to the offsite location, the tracking policy will provide the final destination information. Alternatively, if the container has been identified for a data restore operation and must be restored to the system, final destination information may be a destination in the vicinity of the storage management system or client computer.

Scheduling information in a tracking policy refers to information related to the use of the container for timing and scheduling storage operations. For example, scheduling information may be used to schedule a container of media to be moved from a storage device to an offsite location, and to schedule the return of the container for data verification or other storage operation. Scheduling information may be based on a storage policy or other storage preferences.

Storage operation information refers to information relating to performing a storage operation relating to container media and storage operations which may have been performed to data contained on media in the container. For example, storage operation information may include a type of storage operation to be performed, such as a verification or restore operation, and information about copies, such as auxiliary copies, snapshot copies or other copies which may have been made of the data on the media in the container. Such storage operation information may be related to a storage policy for a container.

In general, the tracking policy, storage policy, and storage preference may be set to a system default policy or template, such as according to a device type, cell group, data type, data classification. Alternatively, such storage policy, storage preference or tracking policy may be customized by a user or administrator.

Figure 7:
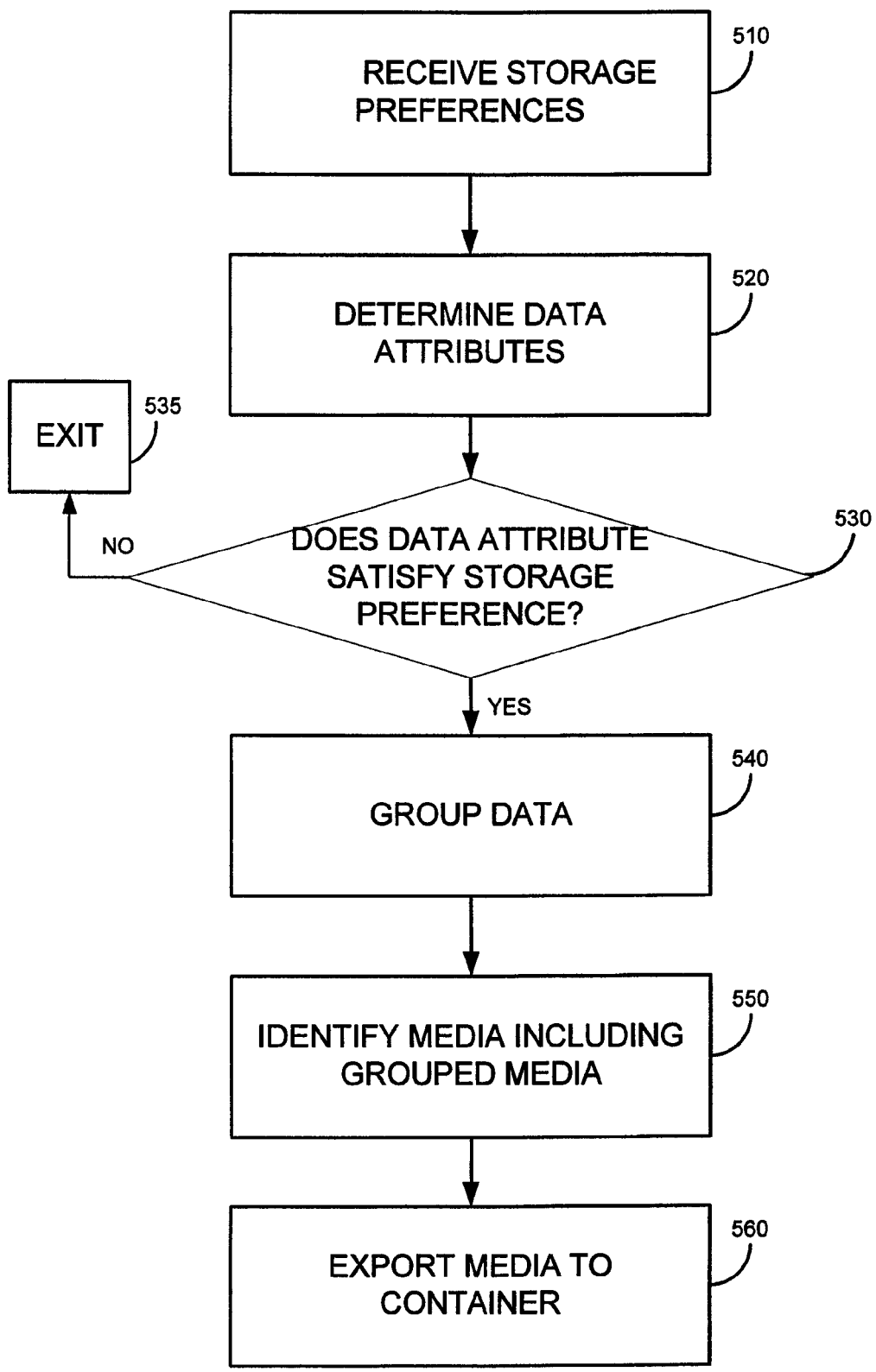
FIG. 7 is a flow diagram for a method of aggregating data according to another embodiment of the invention.

Data may also be aggregated into a container according to the flow diagram shown in FIG. 7. Storage preferences are received by a storage manager or media agent, step 510, such as the storage preferences described in reference to step 410. Such preference can be, for example, that all MICROSOFT EXCHANGE data for a cell group, department, user, or other entity is to be aggregated into a container. A set of media which may include the storage preferences may be identified, step 520. For example, media from one or more storage devices, or other location may be obtained which may include data relating to the storage preferences. The media may be identified by consulting an index, reading metadata associated with media, or other process for identifying media.

A media agent may examine each of the media items to determine whether the media item satisfies the received storage preference. For example, the media agent may obtain a first media item, step 525, and determine whether the media item satisfies the storage preference, step 530. For example, a storage preference may include a data classification or characteristic, such as all data of a particular user that was created more than one year ago may be migrated to offsite storage. If the first media item does not satisfy the storage preference, the media agent obtains the next media item, step 525, such as a second media item. If the media item satisfies the storage preference, e.g., including satisfying a retention threshold and having an appropriate data classification, the media item may be added to a group, step 540. If media remains in the identified set, step 550, additional media items may be added to the group by obtaining a next media item, such as a third media item, step 525. Media may be added to the group to be included in a container, and media exported to the container (step 560). In general, the group media may be grouped logically, for example, by including an identifier for each media item in a table, database or index and associating the media with a container.

Index data will typically include information about a particular data item, including the data type, a media item, the media on which the data is stored, the location of the media and other information. A media agent may determine whether the grouped media is appropriate to add to a container. For example, the media agent will compare the number of media items containing the grouped data to the size of the container, or compare other attributes of the container to the grouped media items. In the event that the number of media items for the grouped or aggregated data exceeds the size threshold of the container, the media agent and storage manager will direct that a second container be used to hold the excess media items. After the media agent has identified the media items for the group of data and determined the number of containers required, the media is exported to one or more containers.

Figure 8:
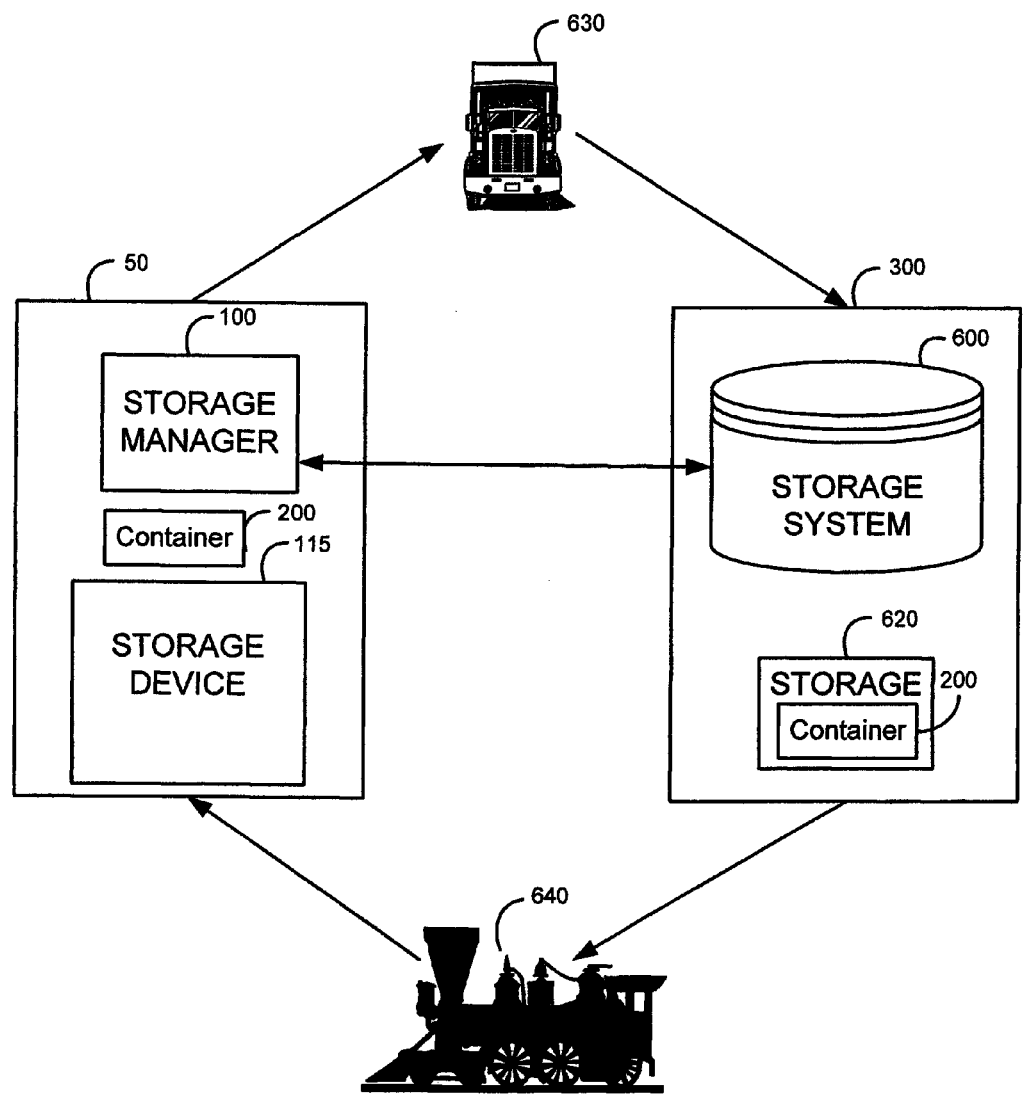
FIG. 8 is a block diagram showing a high-level view of the storage network architecture and components according to an embodiment of the invention.

The container containing the media items may be stored in an onsite location, such as a storage facility, or other location, or exported offsite. Referring to FIG. 8, the container 200 may be transported offsite to a location 300 via a truck or other transportation medium 630. The index is updated to reflect tracking information for the container, including information relating to the movement of the container from the system or onsite location 50 to the offsite location 300. In general, a master storage manager can interface or communicate with third party systems, such as a transportation company and the offsite warehouse to maintain current tracking information. In addition, RFID tags affixed to a container may be scanned and used to track a current location of a container. Continuously updating the index with tracking information indicating the movement of the container is useful to provide current status and location information to a user and may be used together with an alert trigger to cause an alert to be sent to a user, for example, in the event that a container is in an incorrect location or has been in transport for too long.

The tracking information may be used to generate alerts and tracking reports. For example, alerts may be used together with tracking policies and tracking information to notify a user or a system of any event which may require action by a user, such as a change in status of a container. For example, alerts may be customized by a user, or triggered by events such as a container being filled and likely to be moved soon, a container that should be in transit, but is not moving, a container that is due to be used in a storage operation, initiation of an action, delay, completion or failure of container movement, or movement of a container to a particular location, such as a virtual mailslot, retrieval of a container, containers reaching a destination, e.g. offsite storage, containers returned to source, e.g. storage device, or a container movement may be rolled back. An alert may be provided in a message, pop up window, or other communication means.

The tracking information can also be used as a basis for generating reports or alerts as to particular containers, such as system reports on containers exported to offsite storage, or alerts that containers are scheduled for export. Reports include reconciliation reports, container due back reports, container information reports, or other reports detailing the status or location of containers. Reconciliation reports provide a list of pending container movement, e.g. containers that have not reached a final desired location, containers in transit, or other pending movement or transfer. Container due back reports provide a list of containers that are due back to the storage device based on, for example, the last copy, restore time, or retention characteristics, such as the container identified for a restore operation or other storage operation. Container information reports include generally information regarding containers such as identifiers, status, data contained on the container, a classification of the data on the container, movement or action identifiers, location, e.g. in a storage device, in an offsite storage facility, or in transit, association, e.g. with a storage preference or storage policy. Each of these reports and other reports provide regular information to users related to container status. Additionally, a user may customize a report, for example, according to a policy, such as a tracking policy, or movement such as pending actions or movement history, which includes all movements, successful movements or failed movements.

When the container 200 arrives at the offsite location 300, the storage system 600 may update its own internal tracking system to reflect receipt of the container 200 and then subsequently track the location of the container 200 within the offsite location 300. Storing a container 200 at an offsite location 300 may be somewhat more costly than storing one single media item at the offsite location 300, however, the cost and efficiency savings for tracking one container 200 instead of a plurality of media items is often significant.

The offsite location 300 is generally a warehouse or other storage facility and includes at least a storage system 600, which may include a storage management system that can track items in the warehouse 300, and storage 620, which is generally any storage facility known in the art, such as silos, shelving, bins, or other storage space, and other storage system components. The storage system 50 and offsite storage 300 are connected electronically, for example via a network connection, and offline, such as via truck 630 or train 640 routes, or other methods.

Figure 9:
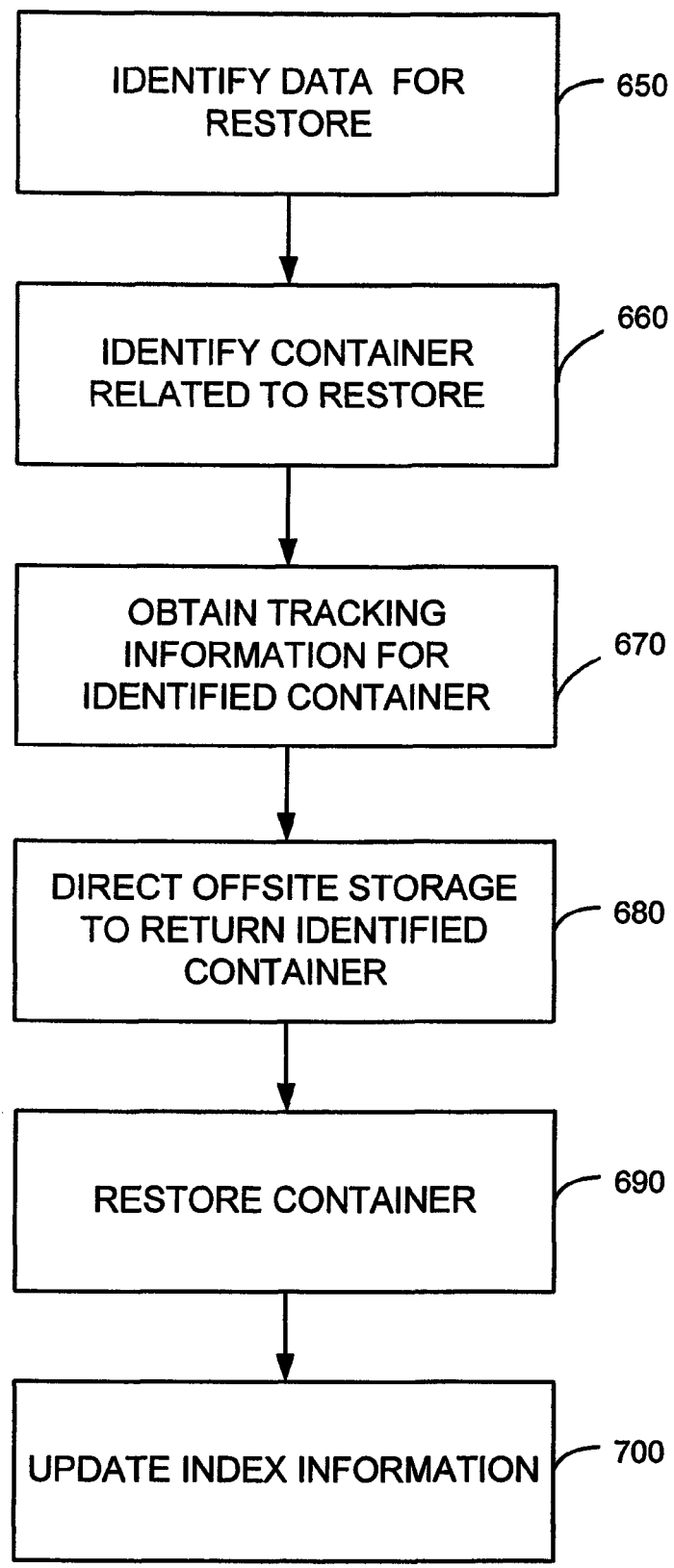
FIG. 9 is a flow diagram for a method of restoring media according an embodiment of the invention.

When data items stored in a container are required, for example, by a client computer or for a data restore operation of a particular storage operation cell, the container must be retrieved from the offsite location 300 and returned to the cell 50 such as via a train 640, car, truck, or other mode of transportation. Referring to FIG. 9, the storage manager may receive an instruction or request to restore data items. The storage manager may identify data required for the restore operation, step 650, by consulting the storage manager or media agent index. The index data relating to the data should indicate the container in which the data is located. Thus, the storage manager may consult the index to identify the container containing the data sought for the restore operation, step 660. The index may also include tracking information for the identified container, which may be obtained by the storage manager, step 670. The tracking information and the container identification information, may be included in an instruction from the storage manager to the offsite location storage system to request return of the identified container, step 680.

The container is restored to the system by retrieving it from the offsite location and returning it to an onsite location, step 690. In general, the container is received and the media included in the container is inserted into a storage device. A media agent may access the data on the media and perform the data restore operation to restore the container data to a client or other component. When the container is received from the offsite location and the media subsequently placed in a storage device, scanned to identify a media identifier, and such identifier information is updated in the index, step 700, to indicate tracking, reintegration and location information for the individual media item. After the data contained in the container has been used in a restore operation, the container may be re-exported to the offsite location, as necessary, or in accordance with storage policies or storage preferences.

The tracking information updated to the index is generally used, as described herein, to facilitate transfers of containers, in particular, to identify containers, for example based on the classification of the data contained in the container, identifiers or other information stored to the index, and the location of the container, both within the system or at an offsite location. For example, tracking information is used in a restore operation to locate a particular container and direct the offsite location to return the container.

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein.

Software and other modules may be accessible via local memory, via a network, via a browser or other application in an ASP context, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other interfaces suitable for the purposes described herein. Screenshots presented and described herein can be displayed differently as known in the art to input, access, change, manipulate, modify, alter, and work with information.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

We claim:

1. A method for tracking a location of data stored to removable media, the method comprising:
receiving a storage preference, the storage preference including a retention characteristic;
identifying at least one data item that satisfies the retention characteristic and identifying a first set of one or more storage media including the at least one data item, wherein the first set of one or more storage media are associated with a first data storage device;
copying the at least one data item from the first set of one or more storage media to a second set of two or more removable data storage media, wherein the two or more removable media are associated with a second data storage device communicatively coupled to the first data storage device;
removing the second data storage device or the two or more removable media from communicative coupling with the first data storage device;

tracking a location of a container, wherein the container contains at least the second set of the two or more removable media, wherein the container is not a vehicle,
  wherein tracking the container includes updating an index associated with the second set with data relating to a current location of the container,
  wherein tracking the container includes either tracking the current location of the container and not tracking the second set of the two or more removable media individually, or tracking both the current location of the container and the second set of the two or more removable media individually, and
  wherein tracking the container includes automatically receiving data associated with the container; and
restoring the at least one data item, wherein the restoring comprises:
  receiving a request to restore the at least one data item;
  identifying both the container having the second set of the two or more removable media on which is stored the at least one data item, and the location of the container;
  providing a request for return of the container from the location; and,
  upon receiving the container that contains the second set of the two or more removable media, and after at least one of the removable media in the second set is loaded into a storage device, restoring the at least one data item.

2. The method of claim 1 wherein tracking the container comprises receiving tracking data from an offsite storage location; and updating the index with the received tracking data.

3. The method of claim 1 wherein tracking the container comprises automatically receiving tracking data based on a barcode label or RFID tag associated with the container; and updating the index with the received tracking data.

4. The method of claim 1 further comprising transmitting an alert to an administrator if the tracked location of the container changes.

5. The method of claim 1 wherein the retention characteristic indicates that data satisfying the data characteristic is due for one or more of: an export operation or a migration operation.

6. A method for tracking a location of data stored to a removable medium, the method comprising:
  determining whether at least one of two or more removable media include data satisfying a storage preference;
  tracking a location of a container,
    wherein the container contains the two or more removable media,
    wherein the two or more removable media were communicatively coupled to a computing device before being contained within the container;
    wherein tracking the location of the container comprises determining the location of the container alone or determining both the location of the container and a location of the two or more removable media, and
    wherein tracking the location of the container further comprises automatically receiving data associated with the container; and
  returning the two or more removable media, wherein the returning comprises:
    receiving a request for data stored on at least one of the two or more removable media;
    identifying both the container having the two or more removable media, and the location of the container; and,
    providing a request for return of the container with the two or more removable media from the location.

7. The method of claim 6 wherein tracking the container comprises updating an index with data relating to the location of the container.

8. The method of claim 6 wherein tracking the container comprises receiving tracking data from an offsite storage location; and updating an index with the received tracking data.

9. The method of claim 6 wherein tracking the container comprises automatically receiving tracking data based on a RFID tag associated with the container; and updating an index with the received tracking data.

10. The method of claim 6 further comprising transmitting an alert to an administrator if the tracked location of the container changes.

11. The method of claim 6 wherein the retention characteristic indicates that data satisfying the data characteristic is due for one or both of: an export operation or a migration operation.

12. A method for tracking data stored to a removable medium, the method comprising:
  storing an identifier for a first data storage item, of a plurality of data storage items, in an index entry;
  determining that the first data storage item satisfies a storage characteristic;
  updating the index entry for the first data storage item with data pointing to a container, wherein the container contains two or more data storage items, including the first data storage item,
    wherein the container is not a vehicle, and
    wherein the two or more data storage items were previously communicatively coupled to a computing system before being contained within the container;
  determining a location of the container, wherein the determining includes automatically receiving data associated with the container;
  updating the index entry for the location of the container;
  receiving a request for data stored on the first data storage item;
  identifying both the container having the first data storage item, and the location of the container;
  providing a request for movement of the container with the first data storage item based on the request; and,
  again updating the index entry for a current location of the container.

13. The method of claim 12 wherein the index entry is updated with tracking data based on a barcode label or RFID tag associated with the container; and updating the index with the received tracking data.

14. The method of claim 12 wherein the index entry is updated with tracking data received from an offsite storage location; and updating the index with the received tracking data.

15. The method of claim 12 further comprising transmitting an alert to an administrator if the tracked location of the container changes.

16. A tangible computer-readable storage medium storing computer executable code, which when executed causes a computer to perform a method for tracking a location of electronic data stored to removable media, the method comprising:
  identifying at least one data item that satisfies a data characteristic or a retention characteristic and identifying a first set of one or more removable media that store the at least one data item, wherein the first set of one or more storage media are associated with a first data storage device;

copying the at least one data item from the first set of one or more removable media to a second set of two or more removable media,
wherein the two or more removable media are associated with a second data storage device communicatively coupled to the first data storage device;

removing the second data storage device or the two or more removable media from communicative coupling with the first data storage device;

determining a location of a container,
wherein the container contains the second set of two or more removable media,
wherein the container is not a vehicle, and
wherein the determining includes determining the location of the container alone, or the location of the container and a location of the two or more removable media;

identifying both the container having the second set of the two or more removable media, and the location of the container; and, providing a request for return of the container with the two or more removable media from the location.

17. The computer readable storage medium of claim 16 wherein determining the location of the container comprises updating an index with data relating to the current location of the container alone, and not determining the location of the second set of two or more removable media location individually.

18. The computer readable storage medium of claim 16 wherein determining the location of the container comprises receiving tracking data from an offsite storage location; and updating an index with the received tracking data.

19. The computer readable storage medium of claim 16 wherein determining the location of the container comprises automatically receiving tracking data based on a barcode label or RFID tag associated with the container; and updating an index with the received tracking data.

20. A tangible computer readable storage medium storing computer executable code, which when executed causes a computer to perform a method for tracking a location of data stored to a removable medium, the method comprising:

receiving a storage preference;

determining whether two or more removable data storage media include data satisfying the storage preference,
wherein the two or more removable media were previously communicatively coupled to a computing system before being contained within the container;

logically associating the two or more removable media with a single container, wherein the container is not a vehicle;

determining a location of the container, wherein the determining includes automatically receiving data associated the container;

identifying both the container having the two or more removable media, and the location of the container; and, providing a request for return of the container with the two or more removable media from the location.

21. The computer readable storage medium of claim 20 wherein tracking the container comprises updating an index with data relating to the current location of the container.

22. The computer readable storage medium of claim 20 wherein tracking the container comprises automatically receiving tracking data based on a barcode label or RFID tag; and updating an index with the received tracking data.

23. The computer readable storage medium of claim 20 wherein the storage preference includes a retention characteristic that indicates that data satisfying the data characteristic is due for one or both of: an export operation or a migration operation.

24. A tangible computer-readable storage medium storing computer executable code, which when executed causes a computer to perform a method for tracking data stored to a removable medium, the method comprising:

storing an identifier for a first data storage item, of a plurality of data storage items, in an index entry;

determining the first data storage item;

updating the index entry for the first data storage item with data pointing to the container, wherein the container contains at least two data storage items, including the first data storage item,
wherein the container is not a vehicle, and
wherein the at least two data storage items were previously communicatively coupled to a computing system before being contained within the container;

identifying a location of the container;

updating the index entry for the location of the container;

receiving a request for data stored on the first data storage item;

identifying both the container having at least the two data storage items, including the first data storage item, and the location of the container;

providing a request for movement of the container with the first data storage item based on the request; and, again updating the index entry for a current location of the container.

25. The computer readable storage medium of claim 24 wherein the index entry is updated with tracking data received from an offsite storage location; and updating the index with the received tracking data.

26. A computer-readable storage medium including computer executable code, which when executed causes a computer to perform a method for managing electronic data, the method comprising:

identifying a set of data satisfying a desired storage characteristic;

among the identified set of data, identifying a first subset of data satisfying a first storage characteristic and a second subset of data satisfying a second storage characteristic, wherein the first and second storage characteristics differ;

identifying two or more first removable media that store the first subset of data;

identifying two or more second removable media that store the second subset of data;

exporting to a first container the two or more first removable media that store the first subset of data; and exporting to a second container the two or more second removable media including the second subset of data,
wherein the first and second containers are not one or more vehicles, and
wherein the two or more first removable media and the two or more second removable media were previously communicatively coupled to at least one computing system before being contained within the respective first and second containers;

receiving a request to import at least a portion of the first subset of data;

receiving the first container containing the two or more first removable media; and after receiving the first container, importing at least a portion of the first subset of data.

* * * * *

UNITED STATES PATENT AND TRADEMARK OFFICE
CERTIFICATE OF CORRECTION

PATENT NO. : 7,877,362 B2  
APPLICATION NO. : 12/501159  
DATED : January 25, 2011  
INVENTOR(S) : Parag Gokhale et al.

Page 1 of 2

It is certified that error appears in the above-identified patent and that said Letters Patent is hereby corrected as shown below:

On the Title Pg. Item (56)
On page 2, under "Other Publications", line 17, delete "recitatiori" and insert -- recitation --, therefor.

In column 11, line 66, delete "or" and insert -- for --, therefor.

In column 17, line 47, in claim 6, delete "preference;" and insert -- preference, wherein the storage preference includes a retention characteristic; --, therefor.

In column 17, line 51, in claim 6, below "media," insert -- wherein the container is not a vehicle, --.

In column 18, line 26, in claim 12, delete "characteristic;" and insert -- characteristic, wherein the storage preference includes a retention characteristic; --, therefor.

In column 19, line 43, in claim 20, delete "preference;" and insert -- preference, wherein the storage preference includes a retention characteristic; --, therefor.

In column 19, line 54, in claim 20, delete "container;" and
insert -- container,
   wherein determining the location of the container includes either tracking the current location of the container and not tracking the second set of the two or more removable media individually, or tracking both the current location of the container and the second set of the two or more removable media individually; --, therefor.

In column 20, line 10, in claim 24, below "entry;" insert -- receiving a storage characteristic, the storage characteristic including retention characteristic; --.

In column 20, line 10, in claim 24, after "determining" insert -- that --.

Signed and Sealed this
Twelfth Day of April, 2011

David J. Kappos
*Director of the United States Patent and Trademark Office*

In column 20, line 10, in claim 24, delete "item;" and insert -- item satisfies the storage characteristic; --, therefor.

In column 20, line 38-39, in claim 26, delete "characteristic;" and insert -- characteristic, wherein the storage characteristic includes a retention characteristic; --, therefor.

In column 20, line 59,
in claim 26, below "containers;"
insert -- tracking a location of the first and second containers,
    wherein the tracking includes updating an index associated with the first subset of data with data relating to a current location of the first container,
    wherein tracking the first container includes either tracking the current location of the first container and not tracking the two or more first removable media individually, or tracking both the current location of the first container and the two or more first removable media individually, and
    wherein the tracking further includes updating an index associated with the second subset of data with data relating to a current location of the second container,
    wherein tracking the second container includes either tracking the current location of the second container and not tracking the two or more second removable media individually, or tracking both the current location of the second container and the two or more second removable media individually, and --.